Feb. 2, 1932.   J. S. TAWRESEY   1,843,463

SEPARATION OF TAPER FITTED PARTS

Filed July 24, 1930

INVENTOR
JOHN S. TAWRESEY
BY
ATTORNEY

Patented Feb. 2, 1932

1,843,463

UNITED STATES PATENT OFFICE

JOHN S. TAWRESEY, OF MONTCLAIR, NEW JERSEY, ASSIGNOR TO THE SKAYEF BALL BEARING COMPANY, OF HARTFORD, CONNECTICUT, A CORPORATION OF CONNECTICUT

SEPARATION OF TAPER-FITTED PARTS

Application filed July 24, 1930. Serial No. 470,262.

This invention relates to separating parts having a taper fit which have been tightly mounted one within another. One of its uses is the removal of anti-friction bearings from journals. The invention embraces a method for unseating one of the taper fitted members from the other upon which it is mounted together with mechanism for applying the removing agent. As for instance, removing an anti-friction bearing from its journal, or a hub from its shaft. When an adapter sleeve is employed for interposition between the two members the force of the removing agent may be applied directly to such adapter sleeve.

Figure 1:
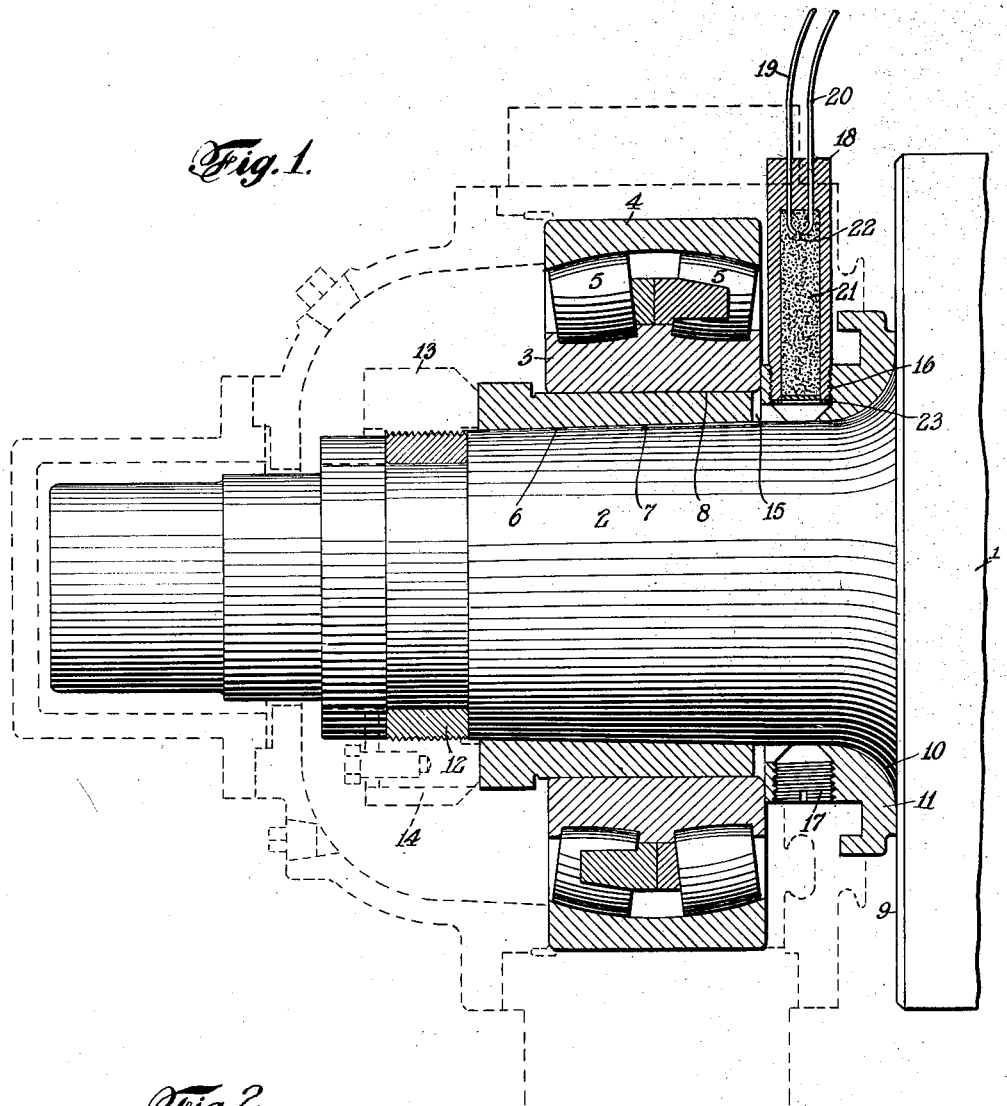
Figure 2:
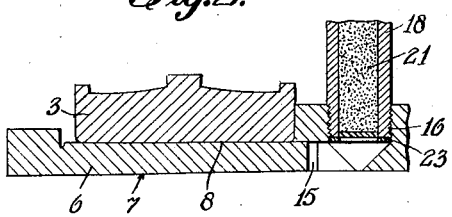

The drawings accompanying this specification illustrate the manner of employing my invention, generally and as applied to an anti-friction bearing mounted on a roll neck through the instrumentality of an adapter sleeve. In which drawings:

Figure 1 is partly a longitudinal section and partly an elevation of the device, and Fig. 2 is a detail longitudinal section illustrating the parts in different form.

The mechanism selected for illustrating my invention is a means for supporting a rolling mill roll 1, the end only of the roll being shown. One of the taper fitted members illustrated is the journal portion of the roll, the roll neck 2, upon which the bearing in the illustration is mounted. This is shown tapering and growing smaller as it extends from the roll. In rolling mill practice the preferable type of an anti-friction bearing is a roller bearing having a smooth cylindrical bore. The form of the bearing which is shown in the illustration comprises an inner ring 3 having a substantially cylindrical bore and an outer ring 4, between which rings there are mounted two sets of rollers 5. This inner ring is mounted upon the journal 2 through the instrumentality of an adapter sleeve 6, and is in practice pressed tightly against an abutment at the inward end of the roll neck of the journal. The inner face 7 of the adapter sleeve is tapered for mating with the taper of the roll neck, and constitutes the other taper fitted member.

The object of my invention is to unseat this inner ring of the anti-friction bearing or the adapter sleeve upon which it is directly mounted from the roll neck and force it outwardly or away from the roll.

Although I do not limit myself to the use of my invention in connection with anti-friction bearings, nor when used in this connection to the precise details illustrated, yet practice has demonstrated the advantage of applying my invention directly to existing types of mountings, two of which are illustrated herein. So that instead of showing means for applying the expelling forces directly back to the member to be removed, in the illustration the inner ring of the anti-friction bearing, it is shown so applied that the expansive force presently to be described will be liberated behind the adapter sleeve 6 which is interposed between the roll neck 2 and the inner ring 3 of the bearing. Thus it will be seen that the inner ring in the illustration is not mounted directly on the roll neck but that there is interposed between it and the roll neck an adapter sleeve 6. The sleeve, as was above noted, is shown formed on its inner face or bore 7 with a taper corresponding to the taper of the roll neck, its outer face 8 being formed substantially cylindrical corresponding to the bore of the inner ring 3.

In most applications of large roller bearings to journals or roll necks the inner ring of the bearing is mounted by means of the application of a considerable amount of pressure so that the inner ring will be held firmly and securely in position.

In the present illustration, which is typical of the mounting of roller bearings on the roll necks such as 2, the neck enters into the end face 9 of the roll by a fillet 10 of rather large radius. There is mounted about this fillet and upon the adjacent portion of the roll neck and bearing against the end face 9, an abutment member in the form of a ring 11 which serves as part of the flinger. Against this abutment member or ring 11 the inner ring 3 of the roller bearing is pressed when the adapter sleeve 6 is forced inwardly between the face of the bore of such inner ring and the face of the roll neck.

In different applications different means are employed for forcing the taper or wedge shaped adapter sleeve between the journal and the inner race ring of the bearing. In my practice of this invention hydraulic pressure of two or three hundred thousand tons has been employed.

In the present illustration a split ring 12 is shown mounted in a groove formed in the roll neck outwardly of its journal portion, which ring is screw threaded on the outer side for receiving a locknut 13. This locknut, when screwed up, holds the adapter sleeve in position, then serves to lock it against any tendency toward outward movement. Some suitable locking device is employed in practice for preventing the rotation of the ring 12. The perimeter of the nut 13 is shown provided with suitable wrench engaging faces 14.

While it is a comparatively easy matter for a working man with simple tools to screw up the nut 13 and apply an enormous amount of pressure for driving the adapter sleeve into its seated position, it is very difficult to pull this sleeve out or to devise some tool for getting behind it and mechanically pushing it out.

It will be obvious that as the problem is to unseat members having a tapered fit, in the illustration the tapered surfaces are between the roll neck 2 and the face 7 of the sleeve 6, a very slight amount of movement of the sleeve outwardly frees it sufficiently to permit the complete separation of the parts.

Roughly speaking, my improved method is to force the part to be removed off the part carrying it, in the illustration the adapter sleeve off the roll neck. The movement after the sleeve is freed from the roll neck is not as violent as one might assume, because immediately the parts start to move they are free and a vent for the expansive gasses is afforded.

Following out my purposes of illustrating this invention with the use of familiar and well known parts, and by changing them as little as possible, I make use of the formation and location of the parts and employ the abutment member 11 as a vehicle upon which to mount some of the parts presently to be described.

In present anti-friction bearing practice there is found a small space, illustrated by the reference character 15, between the inner end of the adapter sleeve 6 and the face of the abutment ring 11.

The illustration shows the manner in which I form a suitable number of screw threaded sockets 16 in the abutment ring 11 communicating with this open space. Two such sockets are illustrated. It is of advantage to form these sockets in the removable and replaceable abutment ring 11 rather than in the solid permanent parts of the roll or roll neck, because the presence of these sockets does not impair its necessary strength. The screw threaded sockets are normally closed with screw plugs 17. These sockets 16 are intended for receiving some suitable cartridge carrier, the carrier being illustrated at 18 and mounted in one of these sockets. This cartridge carrier is shown screwed down on a sealing ring 23 of lead or copper and furnished with the usual type of electric fuse wires 19 and 20 and is partially filled with a charge of explosive 21 sufficient for removing the bearing.

No attempt will be made in this specification to give in detail the charges which will be necessary for removing the various bearings and other parts to which this invention is applicable, because the manufacturers and users of these devices generally have a rather accurate knowledge of the amount of force used to seat them and the amount of force which is required for unseating them. So that by consultation with the manufacturers of explosives they can readily ascertain the amount of charge which will be necessary in any given case. The present recommendation is the use of ordinary black powder, also dynamite.

In the illustrated example, when it is desired to remove the bearing, the various parts illustrated in dotted lines are first removed, then one or both of the screw plugs 17 are removed, and in the sockets 16 there are placed the charged cartridges 18. The nut 13 is also unscrewed and removed. After removing these various parts and upon applying the proper current to the wires 19, 20, a spark is produced at the point 22, whereupon the charge of powder 21 is caused to explode and fill the chamber 15 with an expanding gas. This gas re-acts against the abutment ring 11 which is firmly pressed against the end 9 of the roll, forcing the tapered surfaces apart. In the present illustration the inner surface of the adapter sleeve is freed from the roll neck and carries with it the bearing.

Immediately the adapter sleeve moves sufficiently to free itself from the surface of the roll neck, it moves sufficiently to form a vent for the gas which then escapes without violently blowing the parts off the roll neck.

It will be apparent that the drawings show one embodiment of the invention which has been illustrated herein for the purpose of explaining my invention, and that changes may be made within the scope of the claims without departing from the spirit of my invention.

Having thus described my invention, I claim and desire to secure by Letters Patent:

1. That improvement in the art of separating parts mounted one on the other by taper fitted surfaces which consists in exploding a charge of powder behind one of the parts.

2. That improvement in the art of removing bearings mounted on taper-fitted surfaces which consists in exploding a charge of powder behind the bearing.

3. That improvement in the art of removing bearings which consists in exploding a charge of powder behind a taper-fitted part upon which the bearing is mounted.

4. That improvement in the art of demounting taper-fitted parts which are mounted upon journals, which consists in so mounting one of the parts that there is afforded rearwardly thereof a closed space, and admitting into such space a violently expanding fluid.

5. That improvement in the art of demounting bearings which are mounted by taper fits upon journals, or roll necks, which consists in so mounting the bearing that there is afforded rearwardly thereof a closed space, and admitting into such space a violently expanding fluid.

6. The method of demounting bearings, such bearings being mounted upon a journal or roll neck by means of a sleeve forced between the bearing and the roll neck, there being a tapered surface on one of these and a free closed chamber inwardly of the end of such sleeve, the improved method consisting in discharging a charge of explosive material into such space.

7. The combination with a journal, of a sleeve, a bearing mounted upon the journal by means of the sleeve being forced between it and the bearing, there being a tapered surface on one of these and a free closed chamber inwardly of the end of such sleeve, and means for discharging a charge of explosive material into such chamber.

8. Given as a field in which to work, the following accessories: a journal, a roller bearing mounted thereon, an adapter sleeve forced between the journal and the inner ring of the bearing, there being a tapered surface between the adapter sleeve and at least one of these parts, the inner ring of the roller bearing closely engaging a ring at the inner end of the journal, and there being a free closed space at the end of the sleeve, the method which consists in discharging a charge of explosive into such space.

9. Given as a field upon which to work, a journal, a roller bearing mounted thereon, an adapter sleeve forced between the journal and the bearing, there being a tapered surface between the adapter sleeve and at least one of these parts, the roller bearing being forced against a ring at the inner end of the journal, and there being a free closed space at the end of the sleeve, the combination with the said ring, such ring being formed with a socket adapted to receive a cartridge holder, such socket communicating with such free closed space, of a cartridge seated in such holder and furnished with explosive material.

10. The combination with a journal, of an anti-friction bearing comprising as one of its elements an inner ring mounted on the journal, there being a tapered surface on one of these, a correspondingly tapered adapter sleeve interposed between the inner ring and the journal, and means for applying an explosive force against the inner end of the adapter sleeve.

Signed at New York, N. Y. this 21 day of July, 1930.

JOHN S. TAWRESEY.